(12) United States Patent
Crombez et al.

(10) Patent No.: US 10,539,673 B2
(45) Date of Patent: Jan. 21, 2020

(54) FALSE ALARM AVOIDANCE SYSTEM (71) Applicant: Televic Healthcare NV, Izegem (BE)

(72) Inventors: Pieter Crombez, Torhout (BE); Wouter Cappelle, Izegem (BE); Bart Claeys, Izegem (BE)

(73) Assignee: Televic Healthcare NV, Izegem (BE)

( * ) Notice: Subject to any disclaimer, the term of this patent is extended or adjusted under 35 U.S.C. 154(b) by 0 days.

(21) Appl. No.: 16/474,750

(22) PCT Filed: Jan. 2, 2018

(86) PCT No.: PCT/EP2018/050082
§ 371 (c)(1),
(2) Date: Jun. 28, 2019

(87) PCT Pub. No.: WO2018/122417
PCT Pub. Date: Jul. 5, 2018

(65) Prior Publication Data
US 2019/0346553 A1 Nov. 14, 2019

(30) Foreign Application Priority Data

Dec. 30, 2016 (EP) ...................................... 16207636

(51) Int. Cl.
*G01S 13/74* (2006.01)
*G06K 7/08* (2006.01)
(Continued)

(52) U.S. Cl.
CPC .............. *G01S 13/74* (2013.01); *G01S 1/725* (2013.01); *G01S 13/886* (2013.01); *G06K 7/083* (2013.01)

(58) Field of Classification Search
CPC ........ G01S 13/74; G01S 1/725; G01S 13/886; G06K 7/083
(Continued)

(56) References Cited

U.S. PATENT DOCUMENTS 5,400,246 A * 3/1995 Wilson .................... G06F 3/023
340/12.53
5,917,425 A 6/1999 Crimmins et al.
(Continued)

FOREIGN PATENT DOCUMENTS

EP 2565674 A1 3/2013
EP 2469298 B1 2/2015
(Continued)

OTHER PUBLICATIONS

Applicant's Demand for International Preliminary Examination (Chapter II PCT) submitted Oct. 8, 2015 from Application No. PCT/EP2015/050069 filed Jan. 5, 2015.
(Continued)

*Primary Examiner* — Daryl C Pope (57) ABSTRACT

The invention refers to a method of using a tag in a localisation system, the method comprising at said tag operating a magnetic induction signal detection circuit to detect signals, and upon detection of a magnetic induction signal comprising a first identification code: correlating the magnetic induction signal comprising said first identification code to an ultrasound signal comprising a second identification code, received via an ultrasound signal detection circuit. If said correlation reveals an association between said first identification code and said second identification code: a radio frequency announcement signal is transmitted via a radio frequency signal transmitter circuit to signify said association. The invention also refers to a method of using a beacon in said localisation system, as well as the localisation system comprising one or more tags and one or more beacons.

20 Claims, 2 Drawing Sheets

(51) Int. Cl.
*G01S 13/88* (2006.01)
*G01S 1/72* (2006.01)

(58) Field of Classification Search
USPC .................. 340/539.1, 539.11, 539.13, 3.1
See application file for complete search history.

(56) References Cited

U.S. PATENT DOCUMENTS

| | | | |
|---|---|---|---|
| 5,959,529 A * | 9/1999 | Kail, IV | G01S 19/17 340/539.12 |
| 7,295,132 B2 | 11/2007 | Steiner | |
| 7,489,242 B2 | 2/2009 | Hines et al. | |
| 7,541,942 B2 | 6/2009 | Cargonja et al. | |
| 7,751,829 B2 | 7/2010 | Masuoka et al. | |
| 7,768,392 B1 | 8/2010 | Brand et al. | |
| 7,830,250 B2 | 11/2010 | Huseth et al. | |
| 7,899,006 B2 | 3/2011 | Boyd | |
| 8,139,945 B1 | 3/2012 | Amir et al. | |
| 8,548,490 B2 | 10/2013 | Wang et al. | |
| 2002/0167417 A1 | 11/2002 | Welles et al. | |
| 2003/0030568 A1 | 2/2003 | Lastinger et al. | |
| 2006/0290519 A1 | 12/2006 | Boate et al. | |
| 2007/0139199 A1 | 6/2007 | Hanlon | |
| 2008/0100422 A1 | 5/2008 | Tuttle et al. | |
| 2008/0186233 A1 | 8/2008 | McCoy | |
| 2008/0252426 A1 | 10/2008 | Lee et al. | |
| 2009/0273465 A1 | 11/2009 | Shamir et al. | |
| 2011/0057779 A1 | 3/2011 | Canard et al. | |
| 2013/0309964 A1 | 11/2013 | Hall et al. | |
| 2014/0361903 A1 | 12/2014 | Sawada | |
| 2016/0260301 A1 | 9/2016 | Miller et al. | |

FOREIGN PATENT DOCUMENTS

| | | |
|---|---|---|
| EP | 2889635 A1 | 7/2015 |
| EP | 2889634 B1 | 12/2016 |
| WO | 2007006085 A1 | 1/2007 |
| WO | 2013105589 A1 | 7/2013 |
| WO | 2013169612 A1 | 11/2013 |

OTHER PUBLICATIONS

Applicant's Reply to the Extended European Search Report and European Search Report dated May 23, 2014, filed Jan. 4, 2016, from European Patent Application No. 13199600.1 filed Dec. 24, 2013.
Applicant's response to Oct. 3, 2016 Office Action in U.S. Appl.No. 15/107,798, filed Jun. 23, 2016, submitted Jan. 2, 2017.
Applicant's response to Sep. 22, 2016 Office Action in U.S. Appl. No. 15/107,745, filed Jun. 23, 2016, submitted Dec. 19, 2016.
Extended European Search Report and European Search Report dated May 23, 2014 from European Patent Application No. 13199600.1 filed Dec. 24, 2013.
Extended European Search Report and European Search Report dated May 26, 2014 from European Patent Application No. 13199601.9 filed Dec. 24, 2013.
International Preliminary Report on Patentability dated Jul. 7, 2016 from Application No. PCT/EP2015/050071 filed Jan. 5, 2015.
International Preliminary Report on Patentability dated Dec. 8, 2015 from Application No. PCT/EP2015/050069 filed Jan. 5, 2015.
International Search Report and Written Opinion of the International Search Authority dated May 19, 2015 from International Serial No. PCT/EP2015/050071 filed Jan. 5, 2015.
International Search Report and Written Opinion of the International Search Authority dated Jun. 8, 2015 from International Serial No. PCT/EP2015/050069 filed Jan. 5, 2015.
Office Action from U.S. Appl. No. 15/107,745, filed Jun. 23, 2016, dated Sep. 22, 2016.
Office Action from U.S. Appl. No. 15/107,798, filed Jun. 23, 2016, dated Oct. 3, 2016.
Extended European Search Report from European patent application No. 16207636.8 (filed Dec. 30, 2016), dated Jul. 20, 2017.
International Search Report and Witten Opinion of the International Searching Authority from PCT application No. PCT/EP2018/050082 (filed Jan. 2, 2018), dated Apr. 23, 2018.

* cited by examiner

Figure 1

FALSE ALARM AVOIDANCE SYSTEM

FIELD OF THE INVENTION

The present invention relates to a wireless localisation system for movable objects or persons, such as a system to track the location of patients and/or assets in a facility such as a hospital. The invention also relates to a corresponding method for use in same.

BACKGROUND

Patent application WO2015/097314 A1 in the name of the present applicant, discloses a method for detecting identification tags in an area monitored by one or more beacons. An identification tag comprises a magnetic induction module and a transmitter. The identification tag can receive by means of the magnetic induction module a first beacon message as variations in the magnetic field and extract from said message beacon information. Based on said beacon information, the tag can transmit a localization message, preferably by radio frequency, by means of the transmitter.

The system discloses a combination of radio-frequency technology and magnetic induction technology, based on the insight that a localization mechanism is more accurate if magnetic induction is used.

It is a disadvantage of the known system that it does not offer sufficient spatial accuracy. Indeed, the system in WO2015/097314 A1 can falsely detect an identification tag as being present in a particular part of the monitored area, whereas the identification tag is actually located in a different part of the monitored area. Consequently, said tag is then allocated by the localisation system to a wrong part of the monitored area.

SUMMARY OF THE INVENTION

According to an aspect of the present invention, there is provided a method of using a tag in a localisation system, the method comprising at said tag:
  operating a magnetic induction signal detection circuit to detect signals emitted by one or more beacons;
  upon detection by said magnetic induction signal detection circuit of a magnetic induction signal comprising a first identification code:
    correlating the magnetic induction signal comprising said first identification code to an ultrasound signal comprising a second identification code, received by said tag via an ultrasound signal detection circuit; and
    if said correlation reveals an association between said first identification code and said second identification code: transmitting a radio frequency announcement signal via a radio frequency signal transmitter circuit to signify said association.

It is an advantage of the present invention that identification tags can be located at a high spatial accuracy, wherein false allocation of tags to a certain part of the area the localisation system is monitoring, is avoided.

The method according to the present invention relies on the transmission of signals by use of magnet induction, ultrasound and radio frequency technologies. Due to the nature of these processes, the movement of the identification tag can be traced in real time, resulting in a high overall temporal accuracy.

The tag transmits signals via radio frequency, which consumes little energy compared to other methods for transmitting signals. The use of radio frequency increases the energy efficiency of the tag and allows a longer operational autonomy period for the tag (longer battery life). The use of radio frequency also allows a larger number of identification tags to share the transmission medium (in particular, the assigned radio spectrum).

In an embodiment of the method according to the present invention, the ultrasound signal detection circuit is activated at the tag upon detection of the magnetic induction signal.

It is an advantage of this embodiment that the energy efficiency of the tag is further increased if ultrasound signal detection circuit is only activated when a magnetic induction signal is detected, allowing a longer operational autonomy period for the tag (longer battery life). Preferably, the ultrasound signal detection circuit is activated for a limited period of time upon reception of a magnetic induction signal.

In an embodiment of the method according to the present invention, the tag transmits a radio frequency request signal comprising the first identification code upon detection of the magnetic induction signal to trigger transmission of said ultrasound signal by said one or more beacons.

It is an advantage of this embodiment that broadcasting a radio frequency request signal allows a receiver such as a beacon to start transmitting ultrasound waves only after detecting the radio frequency request signal, thereby further increasing the energy efficiency of the system.

In an embodiment of the method according to the present invention, the radio frequency request signal comprises tag identification information.

It is an advantage of this embodiment that by emitting a radio frequency signal comprising tag identification information upon detecting a magnetic induction signal, a receiver of the radio frequency signal, such as the beacon which transmitted the magnetic induction signal, can perform a first coarse localisation of the tag. The beacon can then e.g. decide that the tag is not entitled to instigate an action near said beacon, and, as a consequence, skip the subsequent but unnecessary step of emitting an ultrasound signal.

In an embodiment of the method according to the present invention, the ultrasound signal detection circuit is operated prior to said detection. The second identification code is stored in a memory at the tag upon receipt of said ultrasound signal. Correlating then comprises correlating said first identification code from said magnetic induction signal to said stored second identification code.

It is an advantage of this embodiment that by storing the second identification code on the tag, the tag can temporarily deactivate the ultrasound signal detection circuit, thereby saving energy. Furthermore, storing the second identification code of the detected ultrasound signal avoids transmitting a radio frequency request signal. Consequently, immediate correlation between the first and the second identification code further increases the temporal accuracy of the tag localisation.

In an embodiment of the method according to the present invention, the radio frequency announcement signal comprises tag identification information.

It is an advantage of this embodiment that it allows the tag localisation system to identify and localise a tag in an area where a plurality of tags are present.

According to an aspect of the present invention, there is provided a method comprising at said beacon:
  operating a magnetic induction signal transmission circuit to transmit a magnetic induction signal comprising a first identification code;

operating a radio frequency signal detection circuit;

upon detection by said radio frequency signal detection circuit of a radio frequency announcement signal: evaluating whether said radio frequency announcement signal signifies an association between said first identification code and a second identification code of an ultrasound signal comprising said second identification code, and, conditionally upon evaluating said association: asserting a localisation alert.

The invention is based on the insight that it is possible to use the combination of magnetic induction communication with ultrasound waves to avoid false positive tag localisation and with high temporal accuracy. It is also an advantage of the present invention that beacons can be used without the need to invoke the interference of a central monitoring system.

In an embodiment of the method according to the present invention, the beacon further comprises an ultrasound signal transmission circuit, and the method further comprises transmitting the ultrasound signal via the ultrasound signal transmission circuit.

It is an advantage of this embodiment that the installation of the localisation system can be made more simple, by providing identical beacons, each of which has an ultrasound signal transmission circuit.

In an embodiment of the method according to the present invention, the ultrasound signal transmission circuit is activated upon detecting a radio frequency request signal comprising the first identification code.

It is an advantage of this embodiment that activation of the ultrasound signal transmission circuit upon detecting a radio frequency request signal increases the energy efficiency of the system. Preferably, the ultrasound signal transmission circuit is operated only for a limited period of time, thereby increasing the energy efficiency of the system.

In an embodiment of the method according to the present invention, the ultrasound signal transmission is operated in a continuous mode.

It is an advantage of this embodiment that it allows tags in the monitored area to store a second identification code in a memory. It further allows tags to temporarily switch off their ultrasound signal detection circuit, thereby optimizing energy efficiency for the tag.

According to an aspect of the present invention, there is provided a system comprising one or more tags for use in the method as described above and one or more beacons for use in the method as described above.

According to an aspect of the present invention, there is provided a computer program product comprising code means configured to cause a processor to perform the functions of said tag in the method as described above.

According to an aspect of the present invention, there is provided a computer program product comprising code means configured to cause a processor to perform the functions of said beacon in the method as described above.

The technical effects and advantages of embodiments of the computer program product, the tag, the beacon, and the system according to the present invention correspond mutatis mutandis to those of the corresponding embodiments of the tag or the beacon according to the invention.

BRIEF DESCRIPTION OF THE FIGURES

These and other features and advantages of embodiments of the present invention will now be described in more detail with reference to the accompanying drawings, in which.

DETAILED DESCRIPTION OF EMBODIMENTS

Figure 1:
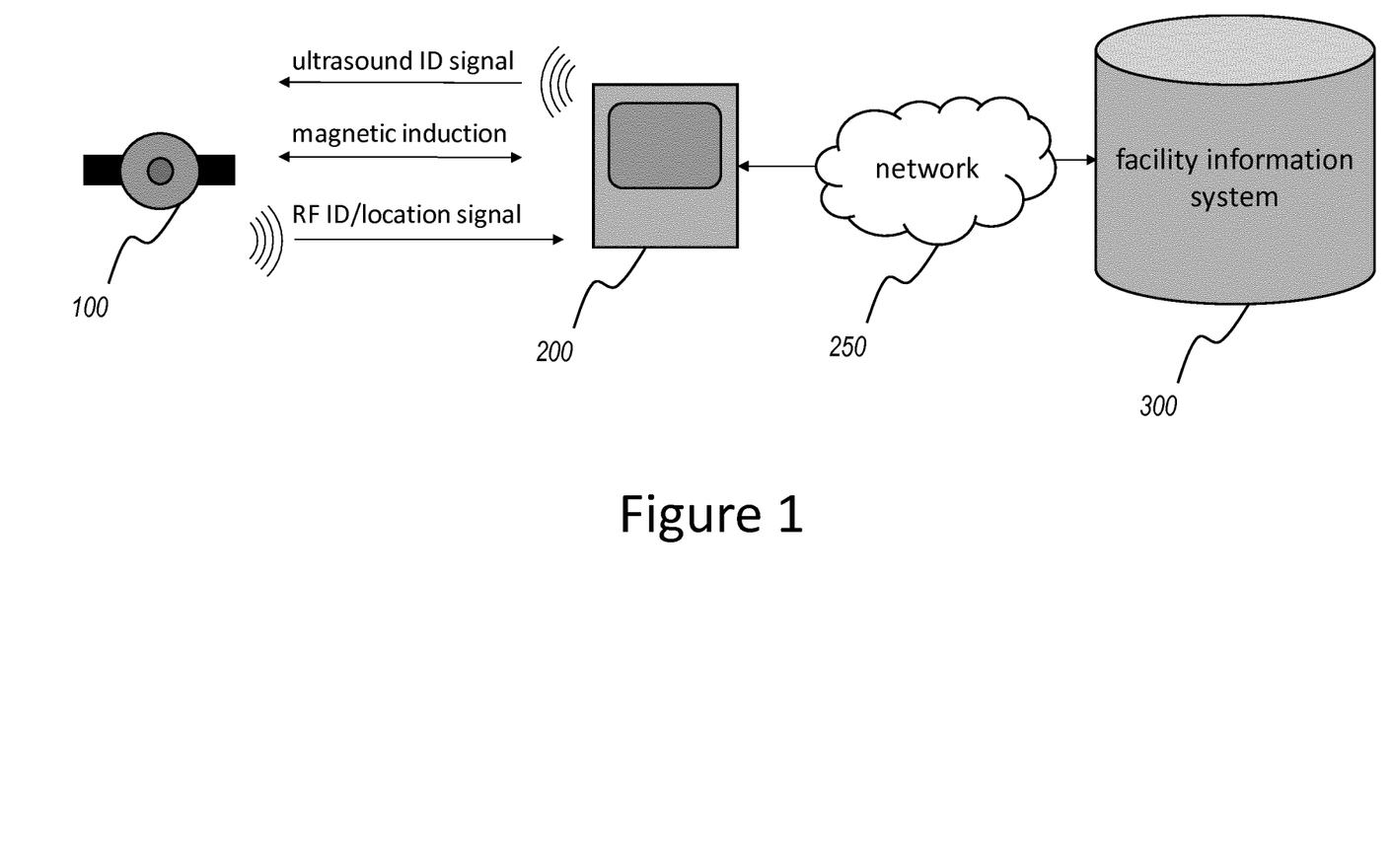
FIG. 1 schematically illustrates a localisation system comprising one or more beacons and one or more tags according to an embodiment of the present invention.

FIG. 1 schematically illustrates a localisation system comprising at least one tag or identification tag 100 and at least one beacon 200 according to an embodiment of the present invention.

A specific application of the localisation system described herein is a wireless tracking system for use in hospitals and other institutions where patients may move about, possibly without being fully conscious of their own exact location. Where appropriate, the invention will be described with reference to such a tracking system, without intent to limit the scope of the invention to such applications. In the context of a wireless tracking system, it is important to localise targets, such as patients and nurses wearing tags, at high spatial and temporal accuracy, in order to guarantee that unauthorized targets cannot reach sensitive parts of the monitored area or accidentally open doors and gates between parts of the area. The development of efficient hardware is also an important goal, with a view to reducing (battery) power consumption, obtaining a small form factor, and keeping the total cost as low as possible.

The system should therefore provide a very accurate determination of the tag's location, both in the spatial dimension (high spatial accuracy) and in the time dimension (low latency tracking), such that adequate responses to tracking events can be deployed immediately and at the right place. It is a goal of the invention to avoid herein false positive errors, or false alarms, as outcome.

For the purpose of the invention, the terms "false alarm" or "false positive" refer to the situation wherein the tag 100 is wrongly allocated by the system to a particular part of a monitored area, where in reality the tag 100 is located in a different part of said monitored area.

In the preferred localisation system, beacons 200 are provided at fixed locations throughout an area in which the location of mobile objects or persons is to be monitored. The beacons 200 may generally be mounted to walls, doors, pillars, and the like. They may have a basic user interface comprising a display and one or more keys. The mobile objects or persons to be monitored are provided with identification tags 100. The beacons 200 can emit a signal comprising an identification code, which can be received and decoded by the tags 100.

According to embodiments of the present invention, it is a goal of the tags 100 to correctly localise moving objects in the monitored area and to detect proximity to sensitive points in this area, such as doors or gates between divisions of a building or building complex, and places where critical objects are kept (e.g., emergency equipment or drugs). This function requires a localisation mechanism that is highly accurate, both in terms of spatial resolution and in terms of latency, and wherein false positive detections are avoided altogether.

For this purpose, the beacons 200 operate a magnetic induction signal transmission circuit and emit a magnetic induction signal comprising a first identification code. Preferably, said first identification code is specific to a particular beacon 200. Magnetic induction communication permits communication between devices using a magnetic field. Typically, a transmitter coil in one device modulates a varying magnetic field which is measured by means of a receiver coil in another device. Magnetic induction is used to achieve very short-range detection and communication (a typical range extends from approximately 10 cm to approximately 1 m; for some applications, a range up to 5 m may be used). Magnetic induction signals are therefore a suitable signal type to obtain short-range localisation accuracy. To this end, the beacons 200 are adapted to broadcast magnetic induction signals, comprising a first identification code, in the form of a varying magnetic field. Within building environments, magnetic induction signals are not completely blocked by walls and can also possibly be detected by tags 100 located at the other side of a wall. For the purpose of detecting magnetic induction signals, the tag 100 is provided with a magnetic induction signal detection circuit.

According to certain embodiments of the invention, the beacons 200 operate an ultrasound signal transmission circuit and can emit an ultrasound signal comprising a second identification code. Preferably, said second identification code is specific to a particular beacon 200. The first and second identification codes of one and the same beacon 200 may be identical or contain identical parts. Ultrasound communication is based on electromechanically induced vibrations that generate propagating longitudinal acoustic waves. As ultrasound waves are by definition in a frequency range beyond the audible range for humans, their use is no hindrance to humans present in the monitored area. Within building environments, ultrasound waves are almost completely blocked by walls (contrary to electromagnetic waves). Ultrasound waves are therefore a suitable signal type to obtain room-level localisation accuracy. The mobile objects or persons to be monitored are provided with tags 100 which comprise an ultrasound signal detection circuit 111. Upon receiving the second identification code encoded in the ultrasound signal, the tag 100 will be aware of its location (in the sense of being able to identify the nearest beacon 200) down to room-level accuracy, without any need for triangulation.

The tags 100 operate a radio frequency (RF) transmission circuit 140. The RF transmission circuit is adapted to wirelessly communicate information to a beacon 200 (the same beacon whose first and/or second identification code was received and/or another beacon within radio range), which may in turn be connected to a wired or wireless network 250 that allows it to communicate with a central monitoring system 300. The range of a RF transmission circuit with typical properties (e.g., using the legally permitted transmit power in the unlicensed ISM bands at 434 MHz, 2.4 GHz, or 5 GHz, or the SRD 868 MHz band) will be longer than that of an ultrasound transmission or a magnetic induction transmission, and will in particular not significantly be constrained by walls.

According to an aspect of the invention, a method of using a tag 100 in a localisation system comprises at said tag 100 the following steps: operating a magnetic induction signal detection circuit 121 to detect signals emitted by one or more beacons 200; upon detection by said magnetic induction signal detection circuit 121 of a magnetic induction signal comprising a first identification code: correlating the magnetic induction signal comprising said first identification code to an ultrasound signal comprising a second identification code, received by said tag 100 via an ultrasound signal detection circuit 111; and if said correlation reveals an association between said first identification code and second identification code: transmitting a radio frequency announcement signal via a radio frequency signal transmitter circuit 140 to signify said association.

According to an aspect of the invention, a method of using a beacon 200 in a localisation system comprises at said beacon the following steps: operating a magnetic induction signal transmission circuit to transmit a magnetic induction signal comprising a first identification code; operating a radio frequency signal detection circuit; upon detection by said radio frequency signal detection circuit of a radio frequency announcement signal: evaluating whether said radio frequency announcement signal signifies an association between said first identification code and a second identification code of an ultrasound signal comprising said second identification code, and, conditionally upon evaluating said association: asserting a localisation alert.

For the purpose of the invention, the term "localisation alert" refers to a signal indicating the location of a particular tag 100 in said monitored area. According to one embodiment, the beacon 200 can assert the location of said particular tag without using a central monitoring system, which can be sounding an alarm or flashing a light. According to a preferred embodiment, the beacon can assert the location of said particular tag by transmitting information regarding its location to said central monitoring system which can trigger a reaction from said central monitoring system.

The beacons 200 in the localisation system operate a magnetic induction signal transmission circuit and can transmit magnetic induction signals comprising a first identification code. Preferably, said first identification code identifies the emitting beacon 200. The beacons 200 in the localisation system can also be provided to operate an ultrasound signal transmission circuit and can transmit ultrasound signals comprising a second identification code. Preferably, said second identification code identifies the emitting beacon 200. The beacons 200 comprise a radio frequency signal detection circuit and can detect radio frequency signals emitted by at least one of the tags 100.

Tags 100 that are located in the area monitored by the beacons 200 operate a magnetic induction signal detection circuit 121 and can detect a magnetic induction signal, emitted by at least one of the beacons 200 in the area. The tags 100 also operate an ultrasound signal detection circuit and can detect an ultrasound signal emitted by at least one of the beacons 200 in the area.

According to a preferred embodiment, the beacons 200 continuously operate the magnetic induction signal transmission circuit. Preferably, the ultrasound signal transmission circuit, when operated by the beacons 200, is also operated in a continuous way. The beacons 200 then simultaneously transmit a magnetic induction signal comprising a first identification code as well as an ultrasound signal comprising a second identification code. A tag 100, which is within reach of the ultrasound signal transmission circuit of the beacon 200 but not within reach of its magnetic induction signal transmission circuit, can store the second identification code of the ultrasound signal emitted by the beacon 200 in a memory. In order to detect this ultrasound signal comprising the second identification code, the tag 100 will activate its ultrasound signal detection circuit 111. Preferably, the tag 100 will activate this circuit at given times, thereby improving energy efficiency of the system and increasing battery-life of the tag 100, and store the most recently detected second identification code.

As the tag 100 can move around the monitored area, the tag 100 can enter at a given moment the reach of the magnetic induction signal transmission circuit of the beacon 200. The tag 100 will then detect a magnetic induction signal comprising a first identification code by use of its magnetic induction signal detection circuit.

The tag 100 will then compare the first identification code of the detected magnetic induction signal with the second identification code stored in its memory with the aim of finding a correlation between both codes.

For the purpose of the present description, it is understood that a positive correlation between a first and a second identification code signifies an association between both codes, meaning that based on both codes, a clear location for the detected tag 100 can be derived without any risk for false alarms. Thereto, the first and second identification codes do not necessarily have to be derived from signals emitted by the same beacon 200. Said codes can be derived from coupled beacons, e.g. the tag 100 detects a magnetic induction signal from one beacon in a room and an ultrasound signal from a different beacon in the same room, allowing to correctly allocate the tag 100. Preferably, the first and second identification code have been transmitted by the same beacon. Although they can be identical or contain identical parts, the first and second identification codes can have an entirely different composition and still result in a positive correlation.

If a positive correlation is found between the first and second identification codes, the tag 100 will transmit a radio frequency announcement signal via its radio frequency signal transmitter circuit 140 to the beacons and/or to a central monitoring system. The radio frequency announcement signal indicates a positive correlation and signifies that an association was found between both identification codes. Typically, the radio frequency announcement signal will comprise at least part of the first or second identification code. As such, it will be clear for the beacons 200 which particular beacon identified the tag 100 and will have to assert a localisation alert. Preferably, the radio frequency announcement signal also comprises information indicating the identity of the detected tag 100. If no positive correlation can be found between the first and second identification codes, the tag 100 will decide that no clear location of the detected tag 100 can be derived, and no radio frequency announcement signal will be transmitted, thereby precluding the possibility of a false positive signal. Upon receiving the radio frequency announcement signal, the beacon 200 will evaluate whether the radio frequency announcement signal signifies an association between a first and a second identification code, and, conditionally upon evaluating said association, assert a localisation alert for the detected tag 100.

Alternatively, the beacons 200 continuously operate the magnetic induction signal transmission circuit as well as the ultrasound signal transmission circuit, but the tags 100 do not have their ultrasound signal detection circuit 111 activated in order to save energy. The tags 100 therefore do not have an identification code stored in their memory. The ultrasound signal detection circuit 111 will only be activated upon detecting a magnetic induction signal. The tag 100 will then detect both the magnetic induction signal and the ultrasound signal and compare the identification codes of both signals.

According to an alternative embodiment, the beacons 200 only operate the magnetic induction signal transmission circuit in a continuous mode. Upon detection of a magnetic induction signal comprising a first identification code, the tag 100 will transmit a radio frequency request signal to said beacons and/or to a central monitoring system. Preferably, said radio frequency request signal comprises the first identification code, preferably along with information indicating its own identity. Upon detection of said magnetic induction signal, the tag 100 also activates an ultrasound signal detection circuit 111, which will preferably remain active during a predetermined amount of time. Upon detecting the radio frequency request signal, the beacon 200 activates an ultrasound signal transmission circuit and emits ultrasound signals comprising a second identification code. Upon detecting the ultrasound signal, the tag 100 then compares the first and second identification codes and, when a positive correlation is found, broadcasts a radio frequency announcement signal signifying an association between both identification codes. The beacon 200 will evaluate whether the radio frequency announcement signal signifies an association between a first and a second identification code, and, conditionally upon evaluating said association, assert a localisation alert for the detected tag 100.

Figure 2:
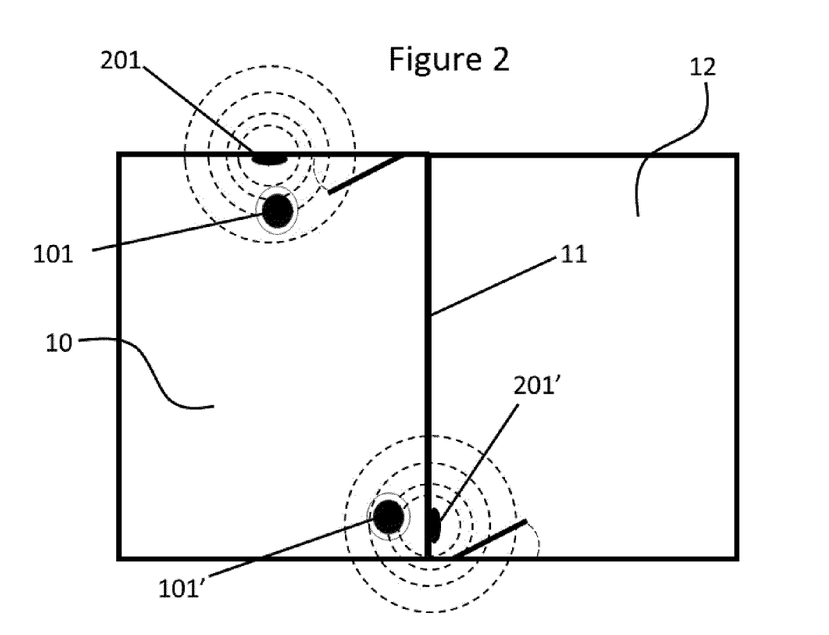
FIG. 2 schematically illustrates the method for localizing a tag in a monitored area, according to an embodiment of the present invention.

Embodiments of the method according to the present invention will now be described with reference to FIG. 2.

Tags 101 and 101' are located in a first room 10, formed by a plurality of walls 11. Beacon 201 is also located in said first room 10, whereas beacon 201' is located in an adjacent second room 12, sharing a wall with first room 10. Beacon 201' is mounted in second room 12 to the wall which is shared with first room 10. A localisation system capable of avoiding false alarms should allocate tags 101 and 101', if detected by a beacon in the same room, to the first room 10 and not to the second room 12. The localisation system should thus demonstrate high spatial accuracy and avoid any false positive detections.

Beacons 201 and 201' operate a magnetic induction signal transmission circuit and transmit short-range magnetic induction signals, comprising a first identification code referring to beacon 201 and 201' respectively. Beacons 201 and 201' can also operate an ultrasound signal transmission circuit and transmit ultrasound signals, comprising a second identification code referring to beacon 201 and 201' respectively.

Tags 101 and 101' operate a magnetic induction signal detection circuit 121 and an ultrasound signal detection circuit 111. Tag 101 is near enough to beacon 201 and can detect the magnetic induction signal broadcasted by this beacon. Tag 101' is near enough to beacon 201' can detect the magnetic induction signal broadcasted by this beacon.

The localisation system according to the present invention implies that the tag 101 would correlate the magnetic induction signal comprising said first identification code, emitted by beacon 201, to the ultrasound signal comprising said second identification code, emitted by the same beacon 201. This correlation would then reveal an association between the first identification code and the second identification code, as both were emitted by the same beacon 201. The tag 101 can then transmit a radio frequency announcement signal, signifying said association. The invention is based on the insight that an association between the first identification code and the second identification code implies a clear unequivocal localisation of the detected tag 101.

Tag 101' would correlate the magnetic induction signal comprising said first identification code, emitted by beacon 201', to the ultrasound signal comprising said second identification code, emitted by the beacon 201. This correlation would not reveal an association between first and second identification code, as they were emitted by beacons 201', located in the second room 12, and 201, located in the first room 10, respectively. As a result, the tag 101' would not send a radio frequency announcement signal, as it cannot be conclusively localised. A false positive, meaning here that the tag would be falsely located in second room 12, is avoided.

The behaviour of the tag 100 may be made location dependent. If the tag 100 is able to determine where it is, it can adapt its behaviour accordingly. One way of accomplishing this, is by including zone information in the signals transmitted by the fixed beacon(s) 200. Thus, in an embodiment of the method according to the present invention, the signals emitted by one of the beacons 200, the one of the beacons 200 being located in a zone, comprise information pertaining to the zone, and the conditionally transmitting a radio frequency signal by the tag 100 comprises comparing the information to one or more zones stored on the tag 100. Based on this comparison, the tag 100 will determine what behaviour is required given the zone it is in. For instance, the tag 100 may dispense with the transmission of location messages as long as it determines it is in its home zone, or in a designated "silent zone". Additionally, or alternatively, the beacon information may comprise an instruction adapted to control an operation of the first tag. This allows the operator of the system to influence the behaviour of the tags 100 according to the time of day, or in response to specific events, such as emergencies.

Figure 3:
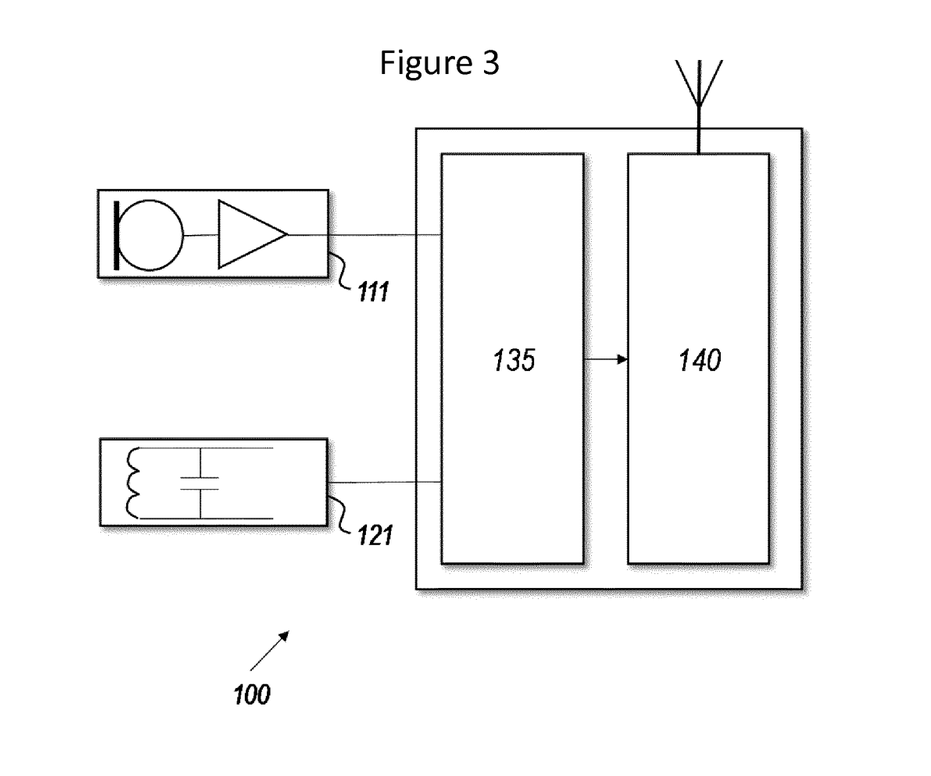
FIG. 3 schematically illustrates elements of an identification tag according to an embodiment of the present invention.

The functional architecture of a tag 100 according to an exemplary embodiment of the present invention will now be described in more detail with further reference to FIG. 3. FIG. 3 illustrates a tag 100 for use in a localisation system for determining a location of the tag 100 in an area monitored by at least one beacon 200.

The at least one beacon 200 is adapted to broadcast information in the form of magnetic induction signals comprising a first identification code and/or ultrasound signals comprising a second identification code, and to receive radio frequency signals.

The identification tag 100 comprises: a magnetic induction signal detection circuit 121 configured to detect and convert a varying magnetic field into an electrical signal; an ultrasound signal detection circuit 111 configured to detect and convert an ultrasound signal into an electrical signal; a processing module 135 adapted to decode said electrical signal and to extract a beacon message therefrom; and a radio frequency signal transmitter circuit 140 adapted to transmit information in the form of radio frequency signals. The tag 100 is configured to transmit said radio frequency signals, conditionally on the beacon information, by means of the radio frequency signal transmitter circuit 140.

As the invention can be understood without reference to common elements like the battery, power manager, user interface, and the like, these elements have not been included in FIG. 3, to keep the latter clear.

The processing module 135 may act as a common front-end and performs synchronization and decodes the respective electrical signals obtained from the electromechanical (ultrasound) signal and the electromagnetic (magnetic induction) signal. Hence, the hardware used to convert the ultrasound waves into an electrical signal, herein also referred to as the ultrasound signal detection circuit 111, and the hardware used to perform magnetic induction coupling, herein also referred to as the magnetic induction signal detection circuit 121, are both coupled to the same processing module 135. The processing module 135 is further connected to the radio frequency signal transmitter circuit 140. The processing module 135 decodes the digital signals, so as to retrieve or extract the transmitted information, and carries out the assessment of the conditions for transmission of a localisation message in response to the beacon message.

The ultrasound signal detection circuit 111 has a channel interface comprising mainly a microphone element with an appropriate frequency response for the used ultrasound signals. The magnetic induction signal detection circuit 121 has a channel interface comprising mainly a coil or ferrite antenna and a resonance circuit. These components, and the necessary ancillary components, are only illustrated schematically.

The functions described hereinabove as pertaining to the processing module 135 may be implemented in dedicated hardware (e.g., ASIC), configurable hardware (e.g., FPGA), programmable components (e.g., a DSP or general purpose processor with appropriate software), or any combination thereof. The same component may also include other functions, including parts of the ultrasound signal detection circuit 111 and/or parts of the magnetic induction signal detection circuit 121. The present invention also pertains to a computer program, optionally stored on a computer-readable medium, comprising code means adapted to cause a processor to perform the functions of the identification tag 100 as described above.

While the invention has been described hereinabove with reference to specific embodiments, this is done to illustrate and not to limit the invention, the scope of which is defined by the accompanying claims. The skilled person will readily appreciate that different combinations of features than those described herein are possible without departing from the scope of the claimed invention.

The invention claimed is:

1. A method carried out in a tag for a localisation system, the method comprising at said tag:
   operating a magnetic induction signal detection circuit to detect signals emitted by one or more beacons;
   upon detection by said magnetic induction signal detection circuit of a magnetic induction signal comprising a first identification code:
   correlating the magnetic induction signal comprising said first identification code to an ultrasound signal emitted by said one or more beacons, said ultrasound signal being suitable for obtaining room-level localisation accuracy and comprising a second identification code, received by said tag via an ultrasound signal detection circuit; and
   if said correlation reveals an association between said first identification code and said second identification code: transmitting a radio frequency announcement signal via a radio frequency signal transmitter circuit to signify said association.

2. The method according to claim 1, wherein said ultrasound signal detection circuit is activated at said tag upon detection of the magnetic induction signal.

3. The method according to claim 2, wherein said tag transmits a radio frequency request signal comprising said first identification code upon detection of the magnetic induction signal to trigger transmission of said ultrasound signal by said one or more beacons.

4. The method according to claim 3, wherein said radio frequency request signal comprises tag identification information.

5. The method according to claim 1, wherein said ultrasound signal detection circuit is operated prior to said detection, and wherein said second identification code is stored in a memory at said tag upon receipt of said ultrasound signal, and wherein said correlating comprises correlating said first identification code from said magnetic induction signal to said stored second identification code.

6. The method according to claim 1, wherein said radio frequency announcement signal comprises tag identification information.

7. A method carried out in a beacon for a localisation system, the method comprising, at said beacon:
operating a magnetic induction signal transmission circuit to transmit a magnetic induction signal comprising a first identification code;
operating a radio frequency signal detection circuit;
upon detection by said radio frequency signal detection circuit of a radio frequency announcement signal:
evaluating whether said radio frequency announcement signal signifies an association between said first identification code and a second identification code of an ultrasound signal emitted by said beacon or a different beacon in the same room by use of an ultrasound signal transmission circuit, comprising said second identification code, and,
conditionally upon evaluating said association: asserting a localisation alert.

8. The method according to claim 7, wherein said beacon further comprises said ultrasound signal transmission circuit, and further comprising transmitting said ultrasound signal via said ultrasound signal transmission circuit.

9. The method according to claim 8, wherein said ultrasound signal transmission circuit is activated upon detecting a radio frequency request signal comprising said first identification code.

10. The method according to claim 8, wherein said ultrasound signal transmission circuit is operated in a continuous mode.

11. A system comprising one or more tags configured to carry out the method according to claim 1 and one or more beacons configured to:
operate a magnetic induction signal transmission circuit to transmit the magnetic induction signal comprising said first identification code;
operate a radio frequency signal detection circuit;
upon detection by said radio frequency signal detection circuit of said radio frequency announcement signal:
evaluate whether said radio frequency announcement signal signifies an association between said first identification code and a second identification code of an ultrasound signal emitted by said beacon or a different beacon in the same room by use of an ultrasound signal transmission circuit, comprising said second identification code, and,
conditionally upon evaluating said association: assert a localisation alert.

12. A computer program product comprising code means configured to cause a processor in a tag to perform the steps of the method according to claim 1.

13. A computer program product comprising code means configured to cause a processor in a beacon to perform the steps of the method according to claim 7.

14. The method according to claim 2, wherein said radio frequency announcement signal comprises tag identification information.

15. The method according to claim 5, wherein said radio frequency announcement signal comprises tag identification information.

16. The method according to claim 6, wherein said radio frequency announcement signal comprises tag identification information.

17. A system comprising:
one or more tags configured to carry out the method according to claim 2; and
at least one beacon configured to:
operate a magnetic induction signal transmission circuit to transmit the magnetic induction signal comprising said first identification code;
operate a radio frequency signal detection circuit; and
upon detection by said radio frequency signal detection circuit of said radio frequency announcement signal:
evaluate whether said radio frequency announcement signal signifies an association between said first identification code and a second identification code of an ultrasound signal emitted by said beacon or a different beacon in the same room by use of an ultrasound signal transmission circuit, comprising said second identification code, and,
conditionally upon evaluating said association: assert a localisation alert.

18. A system comprising:
one or more tags configured to carry out the method according to claim 5; and
at least one beacon configured to:
operate a magnetic induction signal transmission circuit to transmit the magnetic induction signal comprising said first identification code;
operate a radio frequency signal detection circuit; and
upon detection by said radio frequency signal detection circuit of said radio frequency announcement signal:
evaluate whether said radio frequency announcement signal signifies an association between said first identification code and a second identification code of an ultrasound signal emitted by said beacon or a different beacon in the same room by use of an ultrasound signal transmission circuit, comprising said second identification code, and,
conditionally upon evaluating said association: assert a localisation alert.

19. A system comprising:
one or more tags configured to carry out the method according to claim 6; and
at least one beacon configured to:
operate a magnetic induction signal transmission circuit to transmit the magnetic induction signal comprising said first identification code;
operate a radio frequency signal detection circuit; and
upon detection by said radio frequency signal detection circuit of said radio frequency announcement signal:
evaluate whether said radio frequency announcement signal signifies an association between said first identification code and a second identification code of an ultrasound signal emitted by said beacon or a different beacon in the same room by use of an ultrasound signal transmission circuit, comprising said second identification code, and,
conditionally upon evaluating said association: assert a localisation alert.

20. A system comprising:
one or more tags configured to carry out the method according to claim 1; and
at least one beacon comprising an ultrasound signal transmission circuit, wherein the at least one beacon is configured to:
operate a magnetic induction signal transmission circuit to transmit the magnetic induction signal comprising said first identification code;

operate a radio frequency signal detection circuit;
transmit said ultrasound signal via said ultrasound signal transmission circuit; and
upon detection by said radio frequency signal detection circuit of said radio frequency announcement signal:
  evaluate whether said radio frequency announcement signal signifies an association between said first identification code and a second identification code of an ultrasound signal emitted by said beacon or a different beacon in the same room by use of an ultrasound signal transmission circuit, comprising said second identification code, and,
  conditionally upon evaluating said association: assert a localisation alert.

\* \* \* \* \*